(12) United States Patent
Ash, Jr. et al.

(10) Patent No.: US 9,894,717 B2
(45) Date of Patent: Feb. 13, 2018

(54) HEATED VEHICLE SLIDING WINDOW ASSEMBLY

(75) Inventors: Charles E. Ash, Jr., Perrysburg, OH (US); Brian J. Clark, Toledo, OH (US); Thomas S. Hicks, Allen, MI (US); David M. Kovach, Paris, KY (US); Matthew A. Rapin, Tecumseh, MI (US); Keith H. Schwaderer, Fremont, OH (US); Shane C. Seiple, Perrysburg, OH (US); Charles Sitterlet, Northwood, OH (US); Robert M. Thomas, Sylvania, OH (US)

(73) Assignee: Pilkington Group Limited, St. Helens (GB)

( * ) Notice: Subject to any disclaimer, the term of this patent is extended or adjusted under 35 U.S.C. 154(b) by 1052 days.

(21) Appl. No.: 13/546,140

(22) Filed: Jul. 11, 2012

(65) Prior Publication Data

US 2013/0019532 A1 Jan. 24, 2013

Related U.S. Application Data

(60) Provisional application No. 61/508,832, filed on Jul. 18, 2011.

(51) Int. Cl.
*H05B 3/84* (2006.01)
*B60J 1/18* (2006.01)

(52) U.S. Cl.
CPC .............. *H05B 3/84* (2013.01); *B60J 1/1861* (2013.01); *H05B 2203/011* (2013.01)

(58) Field of Classification Search
CPC ..... H05B 3/84; H05B 2203/011; B60J 1/1861
USPC .................... 49/380, 413, 358, 409
See application file for complete search history.

(56) References Cited

U.S. PATENT DOCUMENTS

| | | | |
|---|---|---|---|
| 4,023,008 A * | 5/1977 | Durussel | 219/522 |
| 4,561,224 A | 12/1985 | Jelens | |
| 5,542,214 A | 8/1996 | Buening | |
| 5,996,284 A | 12/1999 | Freimark | |
| 6,014,840 A | 1/2000 | Ray | |
| 6,865,848 B2 * | 3/2005 | Krimmel | 49/409 |
| 7,641,265 B2 | 1/2010 | Seiple | |
| 7,652,226 B2 | 1/2010 | Muromachi | |
| 8,250,812 B2 * | 8/2012 | Hebert et al. | 49/413 |
| 8,402,695 B2 * | 3/2013 | Smith et al. | 49/380 |
| 8,578,654 B2 * | 11/2013 | Rao et al. | 49/413 |
| 2010/0146859 A1 * | 6/2010 | Gipson et al. | 49/348 |
| 2010/0154312 A1 | 6/2010 | Gipson | |

(Continued)

*Primary Examiner* — Gregory Strimbu
(74) *Attorney, Agent, or Firm* — Marshall & Melhorn, LLC (57) ABSTRACT

A heated vehicle sliding window assembly has a fixed glass panel with an opening formed in it and a slidably movable glass panel capable of closing the opening. Disposed on the fixed glass panel are electrically conductive grid lines that form two grid resistors which are connected together as a series circuit, which is connected between two electrically conductive bus bars deposited on the fixed glass panel. Disposed on the slidably movable glass panel are electrically conductive grid lines that form a third grid resistor, which is connected between two other electrically conductive bus bars disposed on the movable glass panel. Both sets of electrically conductive bus bars may be connected together as a parallel circuit when the opening is either opened or closed by the movable glass panel.

19 Claims, 6 Drawing Sheets

(56) References Cited

U.S. PATENT DOCUMENTS

2011/0030276 A1     2/2011   Smith
2012/0291353 A1*   11/2012   Gipson et al. .................... 49/70

\* cited by examiner

HEATED VEHICLE SLIDING WINDOW ASSEMBLY

RELATED APPLICATION

This application claims the benefit under 35 U.S.C. § 119(e) of U.S. Provisional Patent Application Ser. No. 61/508,832, filed Jul. 18, 2011, which is incorporated by reference herein in its entirety.

FIELD OF THE INVENTION

The present invention relates to a heated vehicle sliding window assembly and, in particular, to a heated vehicle sliding window assembly utilizing a heating grid.

BACKGROUND OF THE INVENTION

Pickup trucks and other related vehicles have a rear window (commonly known as a backlite) that is mounted in a vehicle body opening, often immediately behind seats in a vehicle passenger compartment. Typically, such backlites are supplied to vehicle manufacturers as a modular (one piece or as a stand-alone frame) assembly allowing for ready installation in new vehicles being manufactured on an assembly line.

In some of these vehicles, the backlite is provided with a sliding panel mechanism and a seal system (commonly known as a slider), which opens and closes over an opening in the backlite, so as to allow, for example, outside air to enter the vehicle compartment and to allow for passing of objects through the backlite opening. Sliders, in which a sliding panel moves in either a horizontal direction or a vertical direction, typically comprise at least one sliding panel that utilizes frame channels, rails, or tracks to facilitate sliding motion. In addition, a frame, with an attached seal(s), cooperates with the sliding panel to seal out moisture and noise from entering the vehicle compartment at the periphery of the backlite opening.

In addition to the slider panel, some slider assemblies have two fixed panels (hence, they are known as partial sliders), which typically are positioned on either side of the backlite opening. Each fixed panel has a substantially vertically oriented panel edge, on which a vertical track and/or division post are often disposed.

Typically for horizontal sliders, the backlite opening is further defined by an upper header member and a lower beltline support member. In addition, for the horizontal sliders, the slider panel is typically moved in a horizontal direction behind one or both of the fixed panels that span the vehicle opening along horizontal tracks that are commonly disposed on or near the fixed panels, and then, is moved to cover the backlite opening. These movements of the sliding panel may be provided by manual or electro-mechanical means.

Some slider assemblies are further designated as being flush, where the sliding panel is in the plane of the fixed panel(s) when the sliding panel completely closes the backlite opening, or the complete window assembly may be in the plane of a vehicle body panel. Various ways to achieve flush orientation to fixed panels are, for example, by utilizing guide pins, ramps, and cams to move the sliding panel into the backlite opening.

U.S. Pat. No. 7,641,265 to Seiple (hereinafter Seiple) teaches a flush slider, where upper and lower leading guide paths are "S" shaped and each trailing guide path is shaped in a perpendicular manner at one end, which causes the sliding panel to smoothly enter and seal the window opening in a flush manner. In addition, this patent discloses an aesthetically pleasing flush-flush slider which results when the sliding panel is in the plane of the window opening and further in the plane of the outer vehicle body panel. This patent is incorporated by reference herein in its entirety.

U.S. Pat. No. 4,561,224 to Jelens, U.S. Pat. No. 5,542,214 to Buening, and U.S. Pat. No. 5,996,284 to Freimark et al. provide various other forms of sliding panel assemblies. Although these window assemblies might satisfy a current automotive industry styling need, it does not appear that these flush designs have been utilized to any degree by the automotive industry in, for example, pickup trucks.

U.S. Pat. No. 6,014,840 to Ray et al. discloses a heated sliding window assembly that has two fixed panels separated by a sliding panel, all of which have separate electrically conductive heating grids disposed thereon. The three conductive heating grids are arranged in a series circuit, with the sliding panel grid circuit portion being located between the two fixed panels. In order for electricity to flow through any or all of the three grids in this series arrangement, the sliding panel must be closed over the backlite opening.

Ray controls the electrical power, for a manually operated slider assembly, through the use of a latch keeper and latch base that are disposed oppositely on either side of the sliding panel. Consequently, when the sliding panel is closed, electricity flows through all three grids on the three panels (fixed, sliding, and fixed). In much the same way, for an automatically operated slider assembly (so-called powered slider), Ray uses a keeper member and base member to control the electrical power from one fixed panel to the sliding panel, and then on to the second fixed panel. Consequently, Ray's heated sliders do not allow for heating the fixed panels or the sliding panel when the sliding panel is not completely closed over the backlite opening.

Also, it is known that utilizing electrical circuitry in the presence of moisture may raise serious concerns. In light of these concerns, Ray's heated slider assembly makes the connections between the three grids in the latch area of the sliding panel, which is above the lower portion of the slider assembly. Also, the Ray design avoids allowing electrical power to be connected to even the fixed panels when the sliding panel is open.

U.S. Patent Publication 2010/0154312 to Gipson et al. (hereinafter Gipson) describes wide electrical contact strips disposed on the fixed panel that are provided throughout a range of the movement of the sliding panel. The strips, which provide power to a sliding panel, are visually seen. Hence, the Gipson device detracts from the aesthetic appearance of the overall slider panel assembly and Gipson does not teach a window opening frame.

U.S. Patent Publication 2011/0030276 to Smith et al. (hereinafter Smith) describes a flat cable spooling device on the fixed panel that spools out or recoils a flat flexible cable which provides a source of electrical power to a connector on a sliding panel by way of a lower fixed panel frame member. The flexible cable may be covered by a sleeve that is disposed from one side of the backlite to the window opening, wherein the flexible cable stretches out from or is recoiled into the flat cable spooling device. The spooling device, sliding panel connector, and sleeve are visibly seen protruding into the vehicle compartment. Smith also discloses a raceway within the fixed panel frame for providing power to the sliding panel. Hence, the Smith device detracts from the aesthetic appearance of the overall slider panel assembly and Smith does not teach a window opening frame.

It is known that a slider assembly is exposed to moisture. Thus, the slider assembly must block the entrance of moisture into a vehicle compartment when the slider panel closes the backlite opening. However, when the slider assembly has been opened in the presence of moisture, any moisture that can and/or has entered into the vehicle compartment, especially near the lower portion of the slider assembly, must not be able to affect the electrical wiring.

With these considerations in mind, what is sought is a heated slider panel assembly that can function in a flush orientation, where the exterior surface of the heated sliding panel can be placed into the same plane as the exterior surface of a heated or non-heated fixed panel(s). Also sought is a heated slider panel assembly that can function in a flush-flush orientation where the exterior surface of the heated sliding panel is not only placed in the same plane as the exterior surface of a heated or non-heated fixed panel(s), but where the exterior surface of the heated sliding panel is also placed in the same plane as the outer vehicle body panel surface, when the sliding panel is closed.

Further, the electrical connections and wiring of such a heated slider panel assembly need to be applied in a reliable and safe manner since these connections will be exposed to various forms of moisture (e.g., ice, snow, rain). It is preferred that the supplying of electrical power to the heated sliding panel is independent of the supplying of electrical power to the heated fixed panel(s). Also, the wiring of such a heated slider panel assembly should not impede the functioning of the overall slider panel assembly and should not detract from the aesthetic appearance of the overall slider panel assembly.

SUMMARY OF THE INVENTION

A heated vehicle sliding window assembly has a fixed glass panel with an opening formed therein and a slidably movable glass panel capable of closing the opening formed in the fixed glass panel. Disposed on the fixed glass panel is a first plurality of electrically conductive grid lines that form first and second grid resistors which are electrically connected together as a series circuit. This series circuit electrically connects a first set of two electrically conductive bus bars that are disposed on the fixed glass panel. Disposed on the slidably movable glass panel is a second plurality of electrically conductive grid lines that form a third grid resistor which electrically connects a second set of two electrically conductive bus bars. The second set of two electrically conductive bus bars is also disposed on the slidably movable glass panel.

The heated vehicle sliding window assembly further has a rail upon which the slidably movable glass panel moves to open and close the fixed glass panel opening. A peripheral frame may be disposed on and around at least a portion of the periphery of the slidably movable glass panel or, alternatively, on the fixed glass panel around the periphery of the fixed panel opening, wherein the first and second sets of electrically conductive bus bars may be connected together as a parallel circuit, by way of an electrical connection that is (1) disposed between the rail and the frame on the slidably movable glass panel, (2) disposed between the fixed panel and the frame on the slidably movable glass panel, or (3) disposed between the frame on the fixed glass panel and the slidably movable glass panel. The slidably movable glass panel may thus be heated in either an open or closed position.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

It is to be understood that the specific devices and processes illustrated in the attached drawings and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

Figure 1:
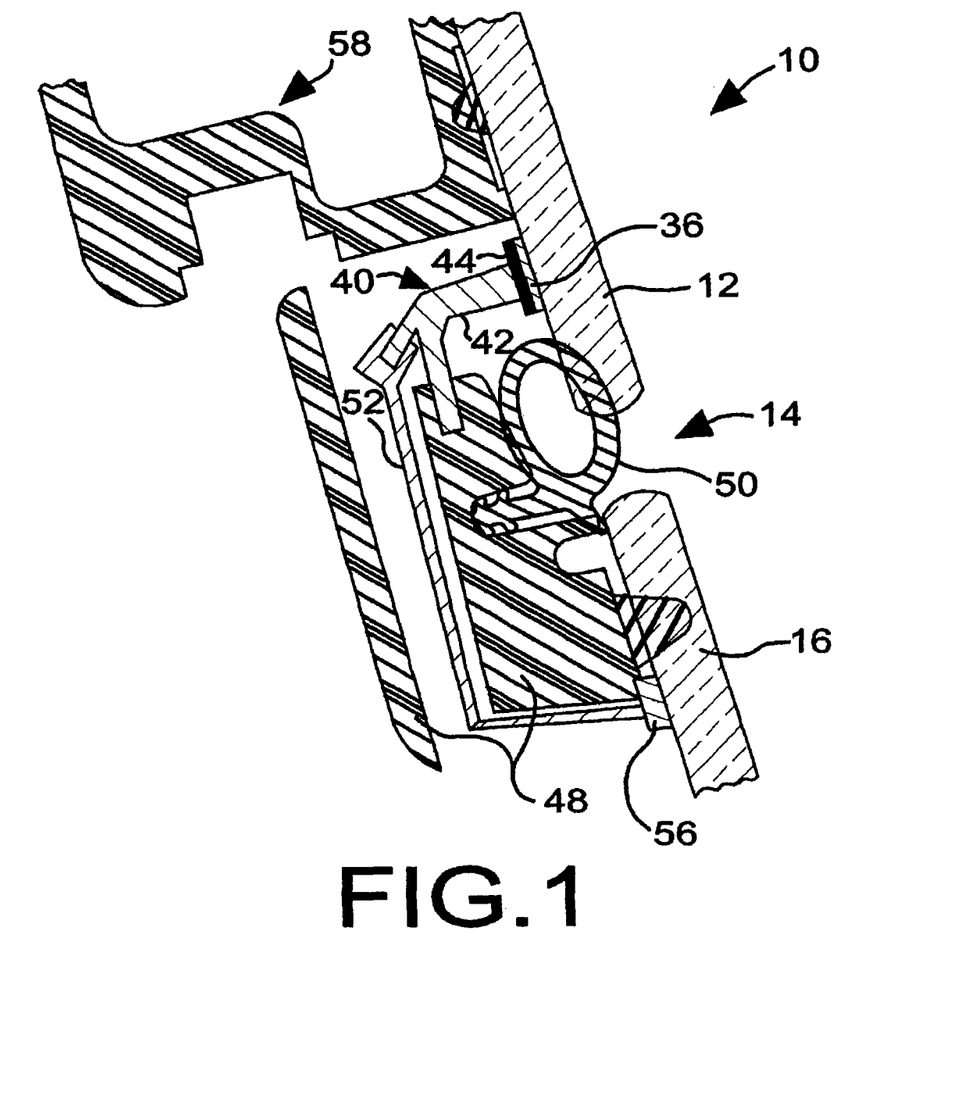
FIG. 1 is a cross sectional view of a portion of a first embodiment of a heated vehicle sliding window assembly in accordance with the present invention taken along the line A-A in FIGS. 2 and 3.
Figure 2:
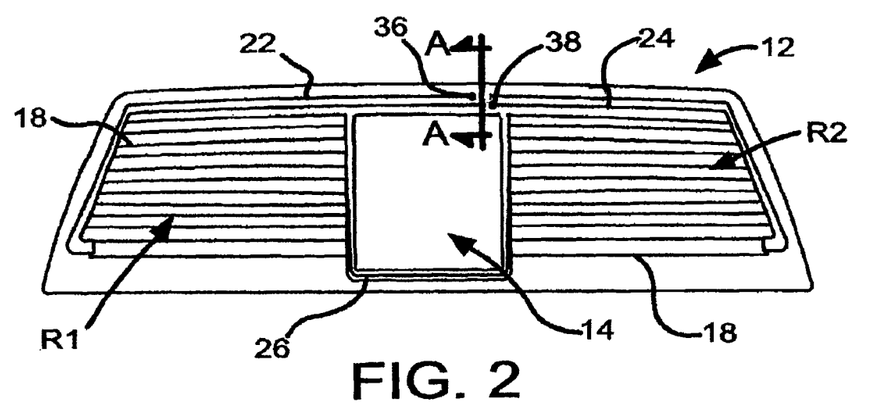
FIG. 2 is a side view of a fixed glass panel in accordance with the present invention.
Figure 3:
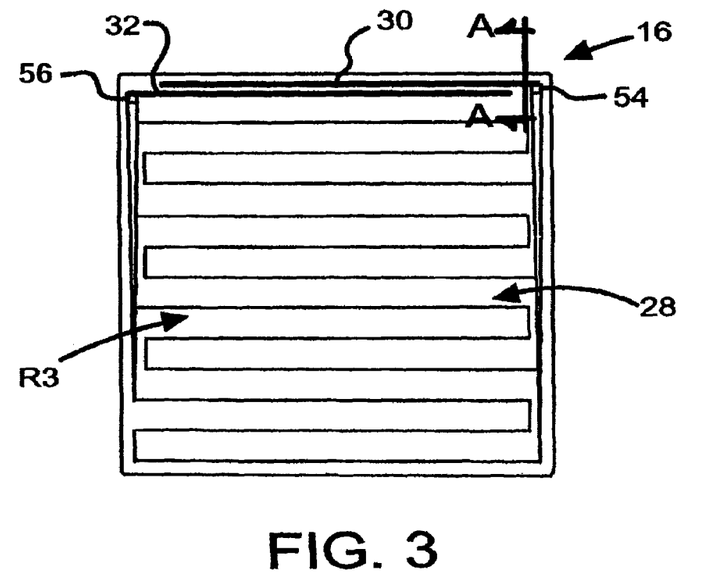
FIG. 3 is a side view of a slidably movable glass panel in accordance with the present invention.

A portion of an embodiment of a heated vehicle sliding window assembly 10, in accordance with the invention, is illustrated in FIG. 1 in the direction of the arrows of the line A-A of combined FIGS. 2 and 3, with an upper rail structure 58. The heated vehicle sliding window assembly 10 has a fixed glass panel 12 with an opening 14 formed therein and a slidably movable glass panel 16 that is capable of selectively closing the opening 14. Although FIG. 2 shows the fixed glass panel 12 as a single panel, the fixed glass panel 12 may comprise two or more separate panels, such as two separate panels forming the vertical edges of the opening 14, a separate panel above the opening 14 forming the upper horizontal edge thereof, and a separate panel below the opening 14 forming the lower horizontal edge thereof.

FIG. 2 further shows the opening 14 along with a plurality of electrically conductive grid lines 18 disposed on the fixed glass panel 12. The plurality of electrically conductive grid lines 18 forms two grid resistors R1, R2 which are electrically connected together as a series circuit 20, which is diagrammed in FIG. 4. The series circuit 20 is electrically connected between a set of two electrically conductive bus bars 22, 24, which are terminated respectively with solder pads 36, 38, with a third conductive bus bar 26 disposed between the two grid resistors R1, R2. The bus bars 22, 24, 26, and solder pads 36, 38 are disposed on the fixed glass panel 12. The flush and flush-flush slider assembly of the Seiple patent is incorporated by reference as an example of a heated vehicle sliding window assembly that could incorporate the heated slider aspects of the present invention.

Figure 5:
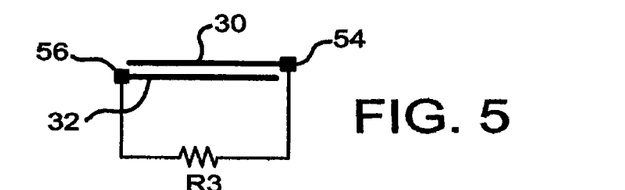
FIG. 5 is an electrical schematic of a series circuit diagram of a heating grid of the slidably movable glass panel of FIG. 3.

As depicted in FIGS. 3 and 5, there is disposed on the slidably movable glass panel 16 a second plurality of electrically conductive grid lines 28 that form a third grid resistor R3 that is electrically connected between another set of two electrically conductive bus bars 30, 32, which are respectively terminated with solder pads 54, 56. The second set of two electrically conductive bus bars 30, 32 is also disposed on the slidably movable glass panel 16.

Figure 6:
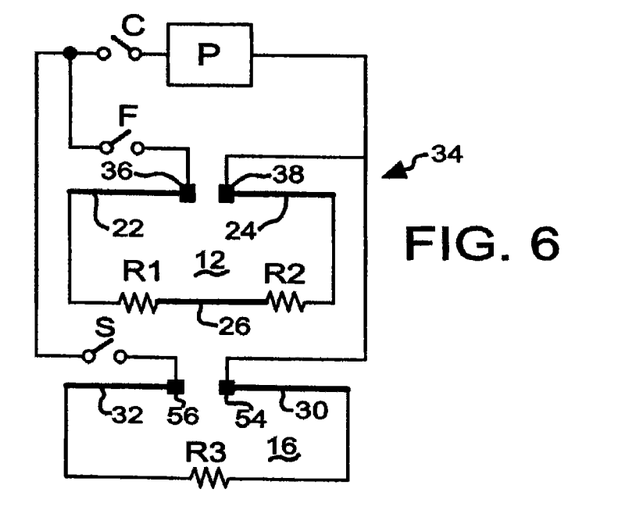
FIG. 6 is an electrical schematic of a parallel circuit diagram of the heating grids of FIGS. 4 and 5.

First and second sets of electrically conductive bus bars 22, 24, 30, 32 may be electrically connected together as a parallel circuit 34, which is illustrated in FIG. 6. When the movable glass panel 16 is either in the open or closed position, the first and second sets of electrically conductive bus bars 22, 24, 30, 32 may be separately, or commonly, selectively electrically connectable to a source of electrical power P (e.g., a battery or an alternator) within a vehicle (e.g., a pickup truck). The electrically conductive bus bars 22, 24, 30, 32 comprise electrically conductive metal, for example silver printed on the corresponding glass panels 12, 16.

FIG. 6 details the commonly, selectively electrically connectable control of the panels 12, 16, wherein power P is available for heating the panels 12, 16 commonly if a common switch C is closed. In order for the fixed glass panel 12 to be selectively heated, both the control switch C and the fixed panel switch F need to be closed. In order for the slidably movable glass panel 16 to be selectively heated, both the control switch C and the slidably movable panel switch S need to be closed. In order for both panels 12, 16 to be selectively heated, the control switch C and both of the glass panel switches F, S need to be closed.

Figure 7:
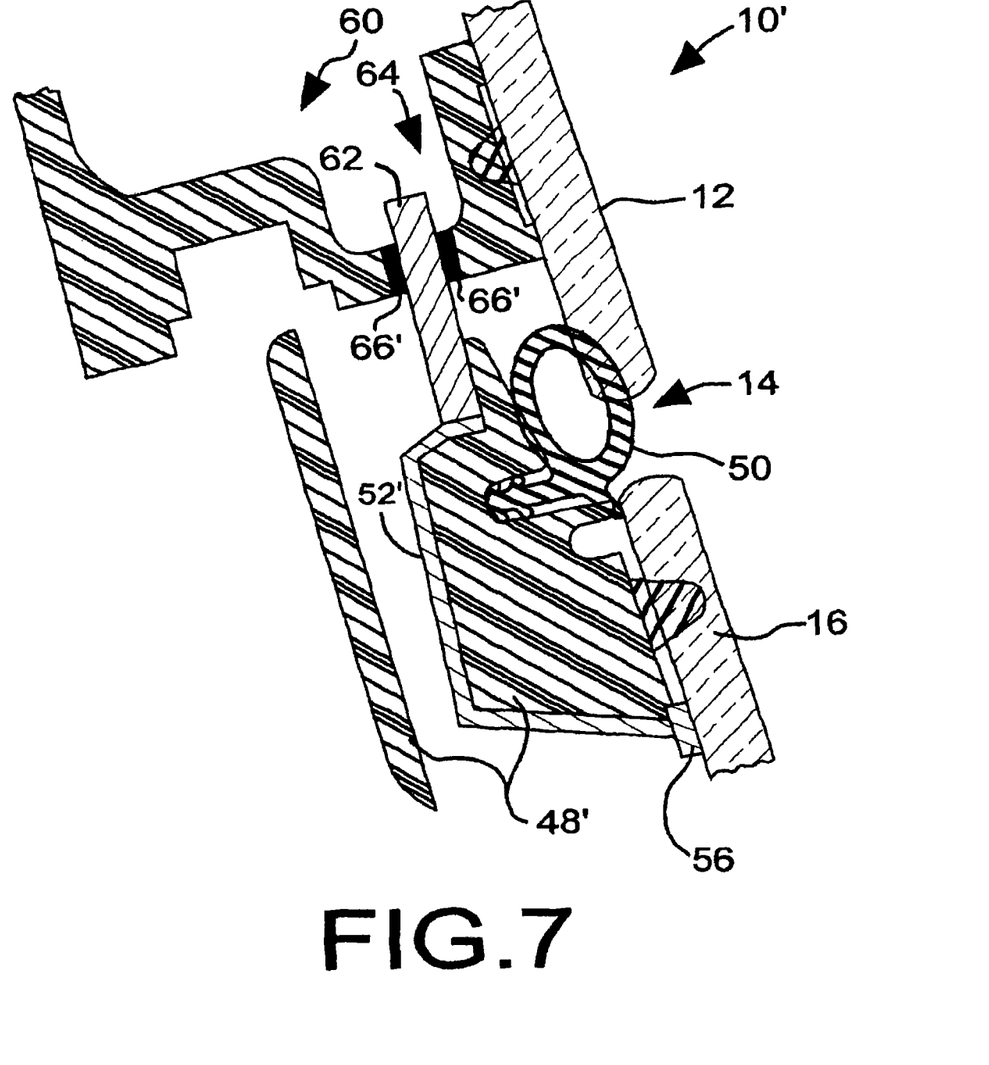
FIG. 7 is a cross sectional view of a second embodiment of a portion of a heated vehicle sliding window assembly taken along the line A-A in FIGS. 2 and 3.

The switches C, F, S may be controlled manually by, for example, a driver, or the switches C, F, S may be controlled automatically by a vehicle electronic control unit (ECU), not shown but common in the art. The switches C, F, S may actually comprise multiples where, for example, the S switch may comprise two "switches," one being in a dashboard of the pickup truck and the other being a sliding connection 66' as shown in FIG. 7, which allows electrical power P to the slidably movable glass panel 16 when the slidably movable glass panel 16 is in a particular location along its travel within a rail structure 60.

Figure 4:
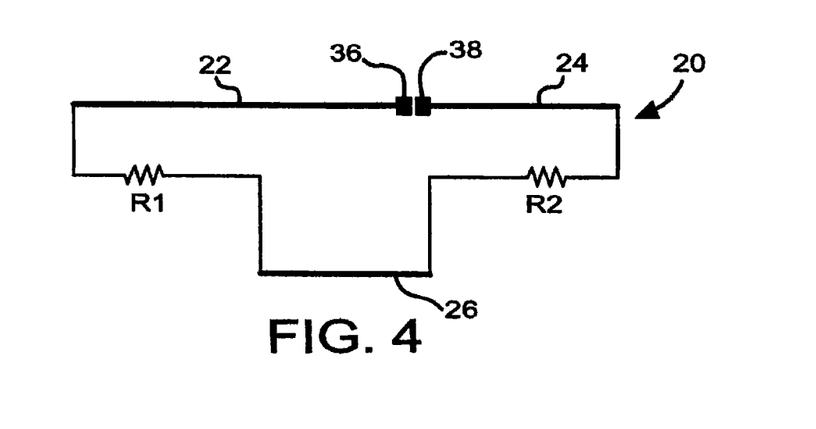
FIG. 4 is an electrical schematic of a series circuit diagram of a heating grid of the fixed glass panel of FIG. 2.

Further illustrated in FIG. 1 is a press fit, electrically conductive clip 40 that has a slider arm 42 in electrical sliding connection 44 with the corresponding solder pad 36, which is disposed on and in electrical contact with bus bar 22 as seen in FIG. 4. Mechanically, the press fit clip 40 is in intimate contact with a sliding panel frame 48, which is disposed on at least a portion of the periphery of the slidably movable glass panel 16 having a fixed panel opening seal 50 that functions to seal the periphery of the fixed panel opening 14. The sliding panel frame 48 is attached to the slidably movable glass panel 16. The sliding panel frame of the Seiple patent is as an example for the overall assembly and application of the frames 48, 48' in the present invention.

Also illustrated in FIG. 1 is a jumper wire 52 that is in intimate mechanical contact with the press fit clip 40. The jumper wire 52 is soldered to and in electrical connection with the solder pad 56 that is disposed on the slidably movable glass panel 16. The solder pad 56 shown in FIG. 1 is one of the two solder pads, where both solder pads 54, 56 are shown in FIGS. 3 and 5. Respectively, the solder pads 54, 56 are electrically connected to the bus bars 30, 32 which are shown disposed one above the other on the slidably movable glass panel 16. The solder pad 36 shown in FIG. 1 is one of the two solder pads, where both solder pads 36, 38 are shown in FIGS. 2 and 4. Respectively, the solder pads 36, 38 are electrically connected to the bus bars 22, 24 which are shown substantially in-line with each other, on the fixed glass panel 12, as seen in FIG. 2.

Even though FIGS. 1, 7, 8, 9 are taken at a single location with one set of terminals and bus bars on the combined assembly of the fixed glass panel 12 and slidably movable glass panel 16, it is to be understood that, as FIGS. 2-6 illustrate, there are corresponding terminals and bus bars to complete the electrical circuit associated with heating the panels 12, 16, in order to complete the circuit from electrical power P through to the electrical components (illustrated, for example, in FIGS. 2-6) of the assemblies 10, 10'', 10''', then to return to the electrical power P.

Although it is preferred for the solder pads 54, 56 to be electrically connected to the set of bus bars 30, 32 at the top of the slidably movable glass panel 16, as shown in FIG. 3, it should be appreciated that the solder pads 54, 56 and bus bars 30, 32 could be located in various locations on the slidably movable glass panel 16. As an example, one bus bar 30 and solder pad 56 could be disposed at the top of the slidably movable panel 16 and the other bus bar 32 and solder pad 54 disposed at the bottom of the slidably movable panel 16. Being located in various locations on the slidably movable glass panel 16 also applies to the location of the first set of bus bars 22, 24 and solder pads 36, 38.

For the embodiment of FIG. 1, the electrical path for heating the slidably movable glass panel 16 is from a source of the power supply P to the solder pad 36 to the sliding connection 44, to the press fit clip 40, to the jumper wire 52, to the solder pad 56, to the bus bar 32, through the grid lines 28 (i.e., R3) for heating the slidably movable glass panel 16, and then to return to the source of electrical power P by way of the bus bar 30, the solder pad 54, a complementary jumper wire, press fit clip, and sliding connection, to the solder pad 38, and then to the return of the power supply P. The complementary jumper wire, press fit clip, and sliding connection that are not shown would function and be connected in a similar manner to their counterparts 52, 40, 44. The exact details of the path for heating the slidably movable glass panel 16, detailed here above, is dependent on the placement of the source sliding connection 44 and its complementary return sliding connection.

FIG. 1 also illustrates an upper rail structure 58, where the slidably movable glass panel 16 moves along for opening and closing the fixed glass panel. The upper rail structure 58 typically cooperates with rail pins, wheels, and the like (not shown but common in the art), in order that the slidably movable glass panel 16 can traverse the fixed glass panel opening 14, thereby opening and closing the fixed glass panel opening 14. The sliding panel frame of the Seiple patent is referenced as an example for an overall assembly and application of the rail structures 58, 60, 70, 90 in the present invention, as seen herein in FIGS. 1, 7, 8, 9, respectively. Incorporating the power connections, like 52, 52', 52'', 66', 72, 80, 82, into the slider rail structure 58, 60, 70, 90 eliminates the need for large wide silver bus bars printed on the glass 12, 16 and reduces the potential for optical reflective distortion, like that found with the Gipson device.

FIG. 7 illustrates another embodiment of the present invention where a heated vehicle sliding window assembly 10' has the fixed glass panel 12, fixed glass panel opening 14, slidably movable glass panel 16, fixed panel opening seal 50, and solder pad 56 of the heated vehicle sliding window assembly 10 of FIG. 1. However, the heated vehicle sliding window assembly 10' further comprises an upper rail structure 60 that is different from the upper rail structure 58 of the assembly 10 of FIG. 1.

In this heated vehicle sliding window assembly 10' embodiment, the upper rail structure 60 is shown having an electrically conductive pin 62 disposed through an area 64 of the upper rail structure 60 that does not interfere with the traversing of the slidably movable glass panel 16 over the panel opening 14. In the heated vehicle sliding window assembly 10', the slidably movable glass panel 16 moves along the upper rail structure 60 for opening and closing the fixed glass panel opening 14.

The pin 62 is attached to a sliding panel frame 48' that is attached to the slidably movable glass panel 16. The pin 62 is also attached to and in electrical contact with a jumper wire 52'. In turn, the jumper wire 52' is electrically connected and soldered to the solder pad 56 that is disposed on the slidably movable glass panel 16. The solder pad 56 shown in FIG. 7 is one of two solder pads 54, 56 that are shown in FIG. 3. Respectively, the solder pads 54, 56 are electrically connected to the bus bars 30, 32 on the slidably movable glass panel 16, as detailed above for the embodiment of FIG. 1.

The pin 62 is in electrical contact with sliding connection 66', which is distributed laterally over the rail structure 60. Whenever the sliding connection 66' is distributed laterally over the rail structure 60, then electrical power P is available to the electrically conductive bus bars 30, 32. Although not shown, there are complementary circuit elements (e.g., pin, sliding connections, and jumper wire) which are connected to the solder pad 56 that cooperate in the return circuit to the source of electrical power P. As a result, the electrical power P is available to the electrically conductive bus bars 30, 32, which may be separately, or commonly, and selectively electrically connectable to the source of electrical power P within the vehicle.

For the embodiment of FIG. 7, the path of electrical current would be from the sliding connection 66' to the pin 62, to the jumper wire 52', to the solder pad 56, to the bus bar 32, on to the grid lines 28 (i.e., R3) for heating the slidably movable glass panel 16, and then on to the complementary return circuit elements mentioned above.

Figure 8:
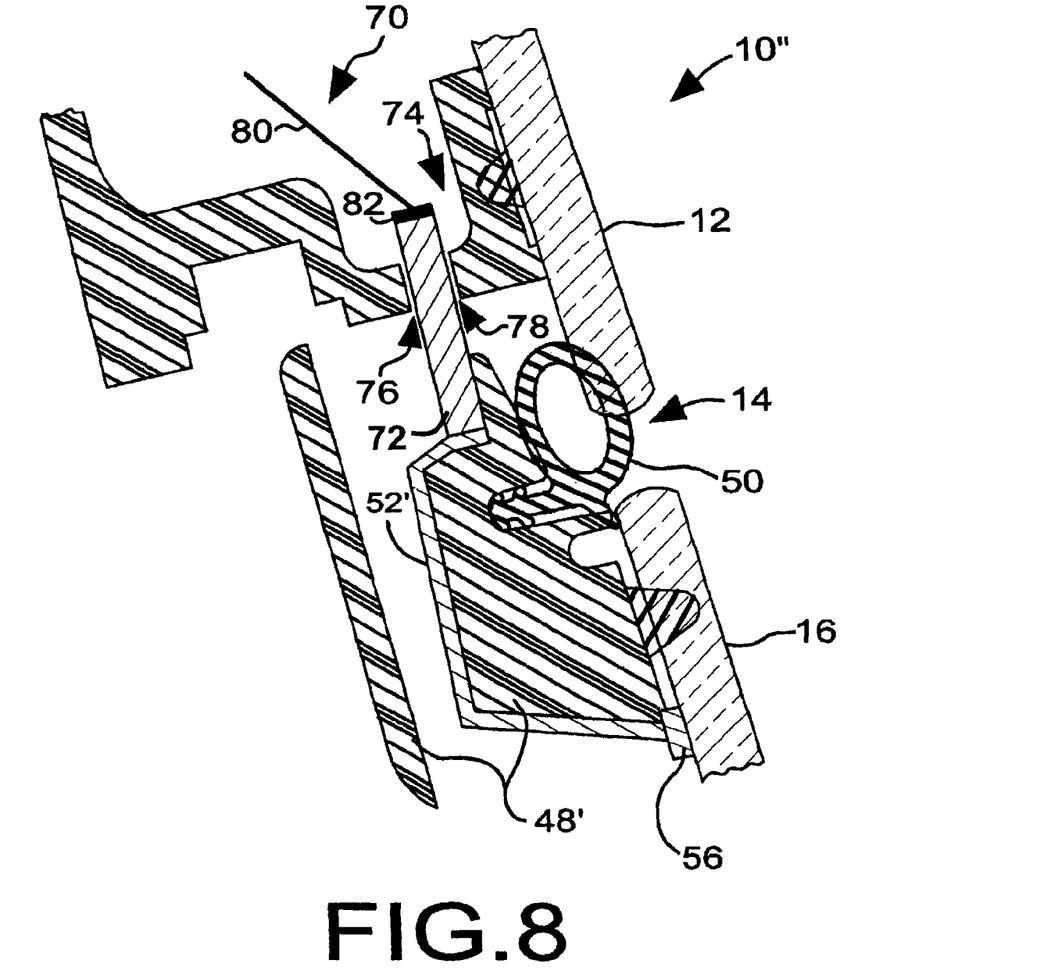
FIG. 8 is a cross sectional view of a third embodiment of a portion of a heated vehicle sliding window assembly taken along the line A-A in FIGS. 2 and 3.

FIG. 8 illustrates yet another embodiment of the present invention, where a heated vehicle sliding window assembly 10" has the fixed glass panel 12, fixed glass panel opening 14, slidably movable glass panel 16, fixed panel opening seal 50, and solder pad 56 of the heated vehicle sliding window assembly 10 of FIG. 1. However, the heated vehicle sliding window assembly 10" of this embodiment further comprises an upper rail structure 70 that is different from the upper rail structure 58 of the assembly 10 of FIG. 1.

In this heated vehicle sliding window assembly 10" embodiment, the upper rail structure 70 is shown having an electrically conductive pin 72 disposed through an area 74 of the upper rail structure 70 that does not interfere with the traversing of the slidably movable glass panel 16 over the panel opening 14. As in the heated vehicle sliding window assembly 10, the slidably movable glass panel 16 moves along the upper rail structure 70 for opening and closing the fixed glass panel opening 14.

The pin 72 is disposed through a rail void 76, having clearance 78 therearound, through which the pin 72 is free to travel laterally over the heated vehicle sliding window assembly 10". The pin 72, however, is attached to a sliding panel frame 48' that is attached to the slidably movable glass panel 16. Also, the pin 72 is electrically connected to a corresponding jumper wire 52'. In turn, the jumper wire 52' is electrically connected to the solder pad 56 that is disposed on the slidably movable glass panel 16. The solder pad 56, shown in FIG. 8, is one of two solder pads 54, 56 that are shown in FIG. 3. Respectively, the solder pads 54, 56 are electrically connected to the bus bars 30, 32 on the slidably movable glass panel 16, as detailed above for the embodiment of FIG. 1.

An extending wire 80 is soldered at a point 82 on the pin 72, such that the extending wire 80 remains in electrical contact all the way through to solder pad 56. Although not shown, there are complementary circuit elements (e.g., extending wire, pin, and jumper wire) which are connected to the solder pad 54 that cooperate in the return circuit to the source of electrical power P, so as to heat the slidably movable glass panel 16 throughout the entire travel of the slidably movable glass panel 16. Thereby, the electrical power P is available to the electrically conductive bus bars 30, 32 which may be separately or commonly, and selectively electrically connectable to the source of electrical power P within the vehicle.

For the embodiment of FIG. 8, the path of electrical current would be from the extending wire 80 to the pin 72, to the jumper wire 52', to the solder pad 56, to the bus bar 32, on to the grid lines 28 (i.e., R3) for heating the slidably movable glass panel 16, and then on to the complementary return circuit elements mentioned above.

Figure 9:
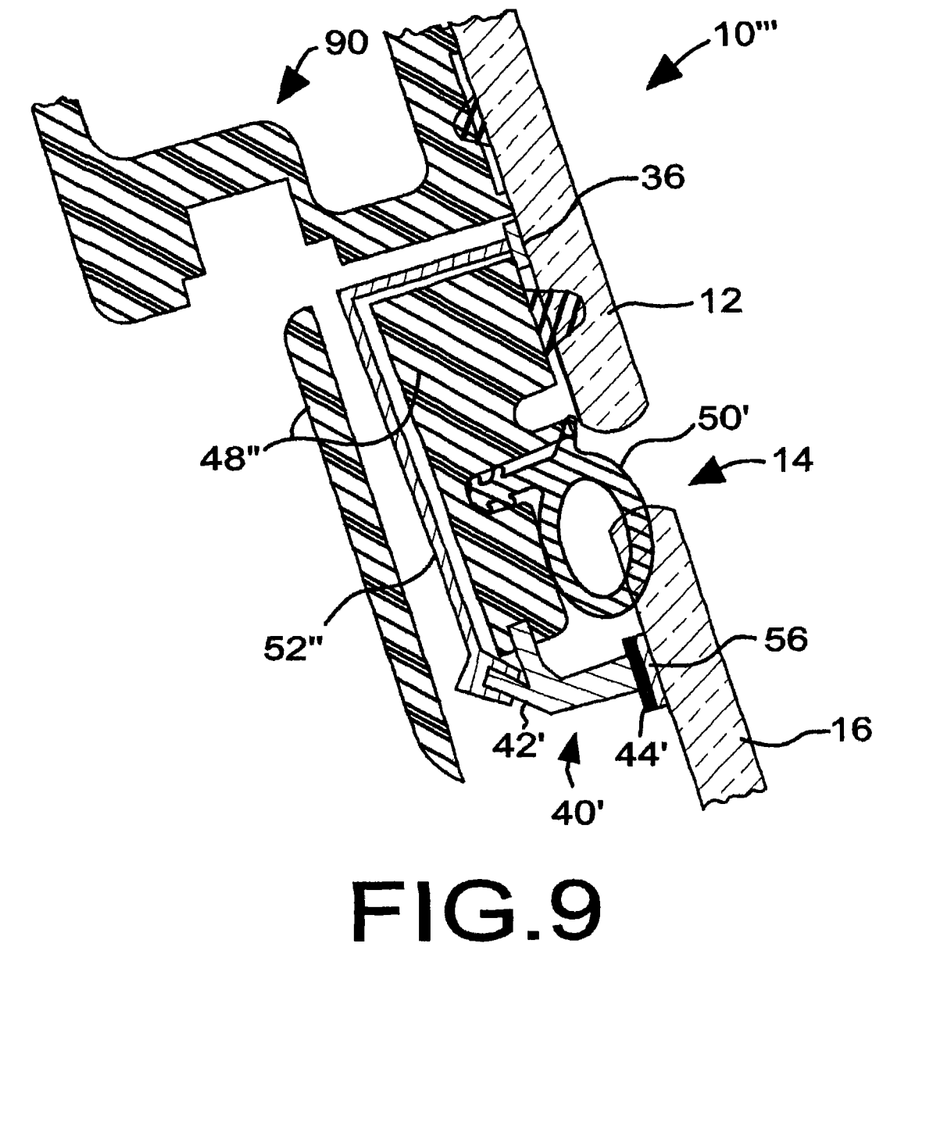
FIG. 9 is a cross sectional view of a portion of a fourth embodiment of a heated vehicle sliding window assembly taken along the line A-A in FIGS. 2 and 3.

FIG. 9 illustrates another embodiment of the present invention, where a heated vehicle sliding window assembly 10'" has the fixed glass panel 12, fixed glass panel opening 14, slidably movable glass panel 16, and rail structure 90 that is similar to the rail structure 58 of the heated vehicle sliding window assembly 10 of FIG. 1. However, the heated vehicle sliding window assembly 10'" of this embodiment has a fixed panel frame 48" having a fixed panel opening seal 50', both of which are disposed on the fixed glass panel 12, on at least a portion of the periphery of the opening 14 of the fixed panel 12. This contrasts with the embodiment depicted in FIG. 1, wherein the sliding panel frame 48 has a fixed panel opening seal 50, both of which are disposed on the slidably movable glass panel 16.

Further illustrated in FIG. 9 is a press fit, electrically conductive clip 40' that has a slider arm 42' having an electrical sliding connection 44' with the corresponding solder pad 56, which is disposed on and in electrical contact with bus bar 32, as seen in FIG. 2. Mechanically, the press fit clip 40' is in intimate mechanical contact with a sliding panel frame 48" having a fixed panel opening seal 50' that functions to seal the periphery of the fixed panel opening 14. The sliding panel frame 48" is attached to the fixed glass panel 16. The sliding panel frame of the Seiple patent is referenced as an example for the overall assembly and application of the frames 48, 48', 48" in the present invention.

Also illustrated in FIG. 9 is a jumper wire 52" that is in intimate mechanical and electrical contact with the press fit clip 40', wherein the jumper wire 52" is soldered to and in electrical connection with the solder pad 36 that is disposed on the fixed glass panel 16. The solder pad 36 shown in FIG. 9 is one of the two solder pads, where both solder pads 36, 38 are shown in FIGS. 2 and 4. Respectively, the solder pads 36, 38 are electrically connected to the bus bars 22, 24 which are shown substantially in-line with each other, on the fixed glass panel 16, as seen in FIG. 2. The solder pad 56 shown in FIG. 9 is one of the two solder pads, where both solder pads 54, 56 are shown in FIGS. 3 and 5. Respectively, the solder pads 54, 56 are electrically connected to the bus bars 30, 32 which are shown disposed one above the other, on the slidably movable glass panel 16, as seen in FIG. 3.

What has been detailed above are, for example, electrical connection means 40, 44, 44', 52, 52', 52", 62, 66', 72, 80 (see FIGS. 1-9) from a fixed panel 12 and rail structures 58, 60, 70, 90 to a slidably movable panel 16. This has been accomplished in a reliable and safe manner. In addition, the supplying of electrical power P can be supplied to the slidably movable panel 16 at various positions along the path of the slidably movable panel 16, through the rail structures 58, 60, 70, 90. Also, the electrical connection means 40, 44, 44', 52, 52', 52", 62, 66', 72, 80 of such heated slider panel assemblies 10, 10', 10", 10''' is not impeded by the functioning of the overall slider panel assemblies 10, 10', 10", 10''' and does not detract from the aesthetic appearance of the overall slider panel assemblies 10, 10', 10", 10''', since the electrical connection means 40, 44, 44', 52, 52', 52", 62, 66', 72, 80 are hidden from sight by the frames 48, 48' and rail structures 58, 60, 70, 90, which may be at the top or bottom of the slider panel assemblies 10, 10', 10", 10'''.

The electrical connection means 40, 44, 44', 52, 52', 52", 62, 66', 72, 80 have preferably small fittings 36, 38, 54, 56 on their ends for connecting to the pluralities of electrically conductive grid lines 18, 28. Hence, the electrical connection means 40, 44, 44', 52, 52', 52", 62, 66', 72, 80 travel with the slidably movable glass panel 16.

In accordance with the provisions of the patent statutes, the principles and modes of operation of this invention have been described and illustrated in its preferred embodiments. However, it must be understood that the invention may be practiced otherwise than as specifically explained and illustrated without departing from its spirit or scope.

What is claimed is:

1. A heated vehicle sliding window assembly, comprising:
 a fixed glass panel having an opening defined therein;
 a slidably movable glass panel configured to be capable of closing the opening defined in the fixed glass panel;
 a first plurality of electrically conductive grid lines comprising two grid resistors electrically connected together as a series circuit, the two grid resistors disposed on the fixed glass panel;
 a first set of at least two electrically conductive bus bars disposed on the fixed glass panel having the series circuit of the two grid resistors electrically connected therebetween;
 a second plurality of electrically conductive grid lines comprising a third grid resistor disposed on the slidably movable glass panel; and
 a second set of at least two electrically conductive bus bars disposed on the slidably movable glass panel having the third grid resistor electrically connected therebetween;
 wherein the first and second sets of electrically conductive bus bars are electrically connected together as a parallel circuit independent of a position of the movable glass panel relative to the fixed glass panel opening.

2. The heated vehicle sliding window assembly of claim 1, wherein the first and second sets of electrically conductive bus bars are selectively electrically connectable to a source of electrical power within a vehicle.

3. The heated vehicle sliding window assembly of claim 1, further comprising at least two solder pads disposed on the fixed glass panel, the fixed panel solder pads capable of being electrically connected to a source of electrical power within a vehicle.

4. The heated vehicle sliding window assembly of claim 3, further comprising at least two electrically conductive clips, each said clip having a slider arm in electrical connection with a respective one of the solder pads, the clips in mechanical contact with a sliding panel frame attached to the slidably movable glass panel.

5. The heated vehicle sliding window assembly of claim 4, further comprising at least two jumper wires, each of said jumper wires is in electrical contact with a respective one of the clips and a respective one of a pair of solder pads disposed on the slidably movable glass panel, and the slidably movable glass panel solder pads are electrically connected to the second set of electrically conductive bus bars disposed on the slidably movable glass panel.

6. The heated vehicle sliding window assembly of claim 5, wherein the two fixed glass panel solder pads are positioned above the fixed glass panel opening and the slidably movable glass panel solder pads are positioned at a top of the slidably movable glass panel.

7. The heated vehicle sliding window assembly of claim 1, further comprising at least one rail structure, wherein the slidably movable glass panel is movable along the rail structure, and an electrical connection disposed between the rail structure and a frame disposed on a periphery of the slidably movable glass panel.

8. The heated vehicle sliding window assembly of claim 7, wherein the electrical connection comprises at least one pair of electrically conductive pins disposed through the at least one rail structure.

9. The heated vehicle sliding window assembly of claim 8, wherein the pins are in mechanical contact with the frame disposed on the periphery of the slidably movable glass panel and each said pin is in electrical contact with a corresponding jumper wire.

10. The heated vehicle sliding window assembly of claim 9, wherein each said jumper wire is electrically connected to a respective solder pad disposed on the slidably movable glass panel and each said solder pad is electrically connected to the second set of electrically conductive bus bars disposed on the slidably movable glass panel.

11. The heated vehicle sliding window assembly of claim 10, wherein each said pin is in electrical sliding contact with said rail structure.

12. The heated vehicle sliding window assembly of claim 11, wherein the pins provide power to the slidably movable glass panel solder pads at least when the slidably movable glass panel is located over the fixed glass panel opening.

13. The heated vehicle sliding window assembly of claim 11, wherein the pins are capable of being in electrical contact with a source of electrical power within a vehicle.

14. The heated vehicle sliding window assembly of claim 10, wherein each said pin has a separate extended wire electrically connected thereto, and the separate extended wires are capable of being electrically connected to a source of electrical power within a vehicle.

15. The heated vehicle sliding window assembly of claim 14, wherein the separate extended wires are configured to provide electrical power from the source of electrical power to the first and second sets of electrically conductive bus bars independent of a position of the slidably movable glass panel along the rail structure.

16. The heated vehicle sliding window assembly of claim 7, wherein the rail structure is positioned above the fixed glass panel opening and a pair of solder pads are positioned at a top of the slidably movable glass panel.

17. The heated vehicle sliding window assembly of claim 1, wherein the first and second sets of electrically conductive bus bars comprise electrically conductive silver printing.

18. The heated vehicle sliding window assembly of claim 1, wherein a bus bar is disposed on the fixed panel between the two grid resistors on the fixed panel.

19. The heated vehicle sliding window assembly of claim 1, wherein the slidably movable panel is flush with the fixed panel when the slidably movable panel is in a closed position.

* * * * *